(12) United States Patent
Devich et al.

(10) Patent No.: US 12,539,396 B2
(45) Date of Patent: Feb. 3, 2026

(54) CATHETER DEVICE FOR REPOSITIONING OR EXPLANTING AN IMPLANTABLE MEDICAL DEVICE

(71) Applicant: BIOTRONIK SE & Co. KG, Berlin (DE)

(72) Inventors: Nicholas Devich, Tualatin, OR (US); Eric Austin, Portland, OR (US); Hannes Kraetschmer, West Linn, OR (US); Brian M. Taff, Portland, OR (US)

(73) Assignee: BIOTRONIK SE & Co. KG, Berlin (DE)

( * ) Notice: Subject to any disclaimer, the term of this patent is extended or adjusted under 35 U.S.C. 154(b) by 1084 days.

(21) Appl. No.: 17/437,662

(22) PCT Filed: Mar. 11, 2020

(86) PCT No.: PCT/EP2020/056514
§ 371 (c)(1),
(2) Date: Sep. 9, 2021

(87) PCT Pub. No.: WO2020/187666
PCT Pub. Date: Sep. 24, 2020

(65) Prior Publication Data
US 2022/0160998 A1    May 26, 2022

Related U.S. Application Data

(60) Provisional application No. 62/818,776, filed on Mar. 15, 2019.

(51) Int. Cl.
*A61M 25/01*    (2006.01)
*A61M 25/00*    (2006.01)
(Continued)

(52) U.S. Cl.
CPC .... *A61M 25/0152* (2013.01); *A61M 25/0075* (2013.01); *A61M 25/0136* (2013.01);
(Continued)

(58) Field of Classification Search
CPC .......... A61M 25/0075; A61M 25/0136; A61M 25/0152; A61M 25/09033;
(Continued)

(56) References Cited

U.S. PATENT DOCUMENTS 10,828,499 B2 * 11/2020 Kabe .................... A61N 1/3756
2003/0144657 A1 * 7/2003 Bowe ................ A61M 25/0147
606/41

(Continued)

FOREIGN PATENT DOCUMENTS

EP         3056157 A2    8/2016
WO  WO-2012082755 A1 *  6/2012  ........... A61B 17/221

OTHER PUBLICATIONS

International Search Report (PCT/ISA/210) and Written Opinion (PCT/ISA/237) mailed on May 6, 2020, by the European Patent Office as the International Searching Authority for International Application No. PCT/EP2020/056514.

*Primary Examiner* — Kankindi Rwego
(74) *Attorney, Agent, or Firm* — Buchanan Ingersoll & Rooney PC

(57) ABSTRACT

A catheter device for repositioning or explanting an implantable medical device comprises an outer catheter, and a steerable catheter extending through the outer catheter, wherein the outer catheter is axially movable with respect to the steerable catheter. A snare catheter extends through the steerable catheter, wherein the snare catheter is axially movable relative to the steerable catheter. A mandrel may extend through the snare catheter and comprising a distal end, wherein the mandrel is axially movable relative to the (Continued)

snare catheter. A snare may be arranged on the distal end of the mandrel for establishing a connection to the implantable medical device, wherein the snare, by moving the mandrel with respect to the snare catheter, is at least partially retractable into the snare catheter.

14 Claims, 7 Drawing Sheets

(51) Int. Cl.
*A61M 25/09* (2006.01)
*A61N 1/375* (2006.01)

(52) U.S. Cl.
CPC ............... *A61M 25/09033* (2013.01); *A61M 2025/0163* (2013.01); *A61M 2025/09166* (2013.01); *A61N 1/3756* (2013.01)

(58) Field of Classification Search
CPC .......... A61M 2025/0163; A61M 2025/09166; A61B 17/32056; A61B 2017/00358; A61N 1/3756
USPC ......................................................... 606/129
See application file for complete search history.

(56) References Cited

U.S. PATENT DOCUMENTS

| | | | |
|---|---|---|---|
| 2012/0004647 A1* | 1/2012 | Cowley | A61B 17/221 606/1 |
| 2013/0103047 A1 | 4/2013 | Steingisser et al. | |
| 2018/0303514 A1 | 10/2018 | Coyle et al. | |
| 2020/0022751 A1* | 1/2020 | Denison | A61B 18/1477 |

\* cited by examiner

Leadless Pacemaker
placed in Septum of RV

Leadless Pacemaker
placed in Apex of RV

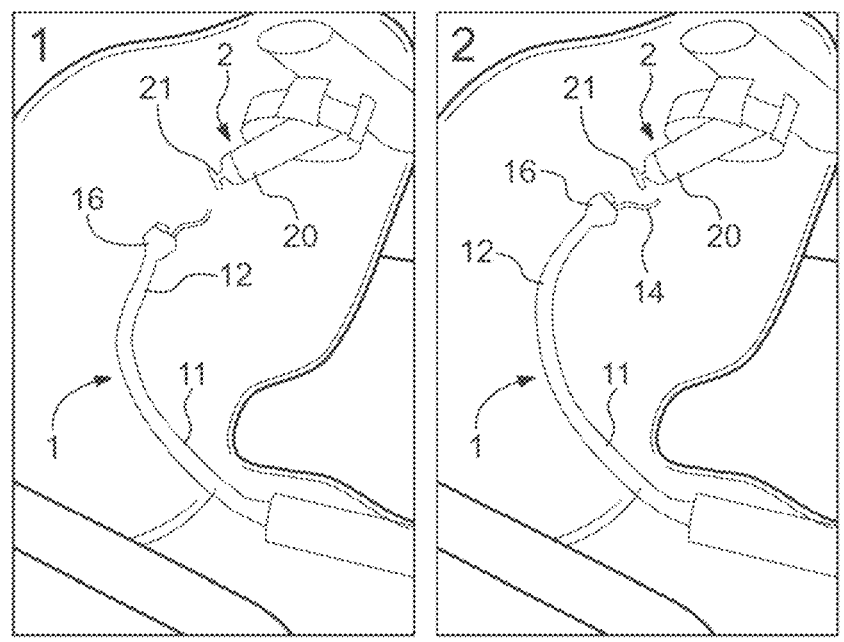
FIG. 7A — Inner Cath Steers into RV
FIG. 7B — Snare Cath advanced up to implant
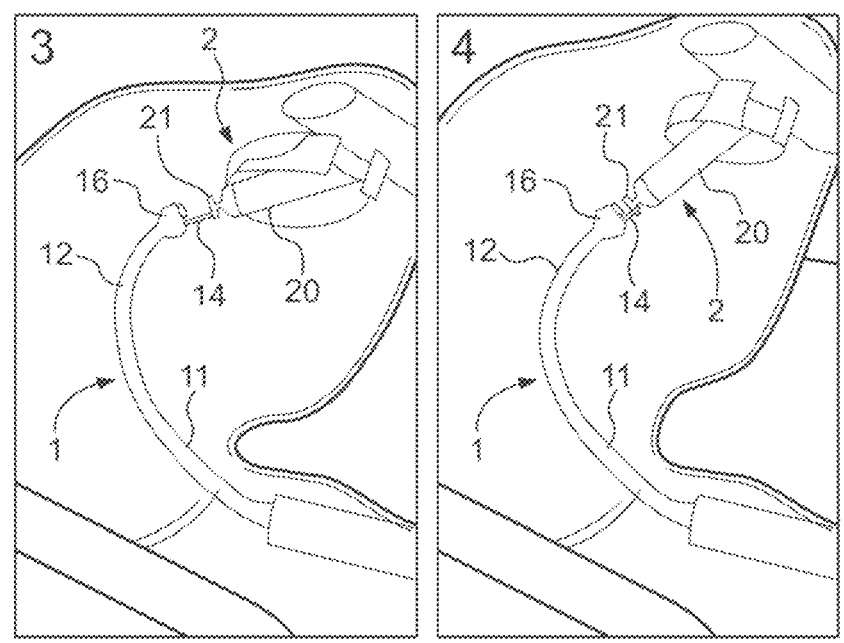
FIG. 7C — Snare advanced over implant
FIG. 7D — Snare tensioned to establish connection Outer Cath is advanced over the Inner Cath up to the Implant Implant is retraced into the Implant Projector Cup / Outer Catheter Implant and Catheter are removed from the anatomy Steering Mechanism Utilized for
Repositioning of Implant in Apex of RV

CATHETER DEVICE FOR REPOSITIONING OR EXPLANTING AN IMPLANTABLE MEDICAL DEVICE

CROSS-REFERENCE TO RELATED APPLICATIONS

This application is the United States national phase under 35 U.S.C. § 371 of PCT International Patent Application No. PCT/EP2020/056514, filed on Mar. 11, 2020, which claims the benefit of U.S. Patent Application No. 62/818,776, filed on Mar. 15, 2019, the disclosures of which are hereby incorporated by reference herein in their entireties.

TECHNICAL FIELD

The instant invention relates to a catheter device for repositioning or explanting an implantable medical device according to the preamble of claim 1, and to a method for operating a catheter device.

BACKGROUND

A catheter device of this kind comprises an outer catheter and a steerable catheter extending through the outer catheter. The outer catheter herein is axially movable, such that that it may translate along the long axis of the catheter's working length, with respect to the steerable catheter.

The instant disclosure in particular relates to a catheter design suitable for acute explantation and repositioning of a leadless pacemaker.

An implantable medical device as concerned herein may for example be a leadless pacemaker device which is to be implanted in a patient's heart, for example in the right ventricle or right atrium of the patient's heart. An implantable medical device of the kind concerned herein however may also be a sensor device or the like.

Implantation of an implantable medical device such as a leadless pacemaker requires proper positioning and delivery of the implant to a specific location of, e.g., the heart. During an implantation procedure, the device is implanted into, e.g., the heart where it is anchored by a suitable fixation mechanism, for example, a multitude of flexible metal tines. Electrical and fixation measurements are performed by the physician to confirm that an implantation site is suitable prior to release of the implant. However, in some cases, even after determining suitability of an implantation site and releasing the implant, it may be determined that the site location of the implant is no longer acceptable for the implant to function properly. This assessment may arise hours, days, weeks, and potentially months following implantation. It is in these situations, where ingrowth and encapsulation of the implant has not yet taken place (or at least not to a confounding extent), that a physician would need to either remove the implant from the patient or reposition it to a new location where it could function properly.

There hence is a general need for a catheter device that allows a user to navigate easily and reliably up to an implantable medical device, in particular a leadless pacemaker, acutely implanted in, e.g., the apex or septum of the right ventricle, recapture it, and either reposition and release it within a new desired location, e.g. within the right ventricle, or explant the device and catheter from the patient anatomy.

A catheter device as described in U.S. Publication No. 2018/0303514 A1 is suited for delivery and retrieval of a leadless pacemaker and for this includes features to facilitate manipulation of the catheter and a capturing and docking functionality of a leadless pacemaker. Such functionality includes mechanisms directed to deflecting and locking a deflectable catheter, maintaining tension on a retrieval feature, protection from anti-rotation, and docking cap and drive gear assemblies.

The present disclosure is directed toward overcoming one or more of the above-mentioned problems, though not necessarily limited to embodiments that do.

SUMMARY

It is an object to provide a catheter device and a method for operating a catheter device which allow navigating easily and reliably up to an previously implanted leadless pacemaker, implanted for example in the patient's heart, recapture it, and either reposition and release it within a new desired location, or explant the device and then remove the catheter from the patient anatomy.

At least this objective is achieved by means of a catheter device comprising the features of claim 1.

Accordingly, the catheter device comprises a snare catheter extending through the steerable catheter, wherein the snare catheter is axially movable relative to the steerable catheter, the snare catheter being configured to receive a mandrel carrying a snare such that the mandrel is axially movable relative to the snare catheter.

In one embodiment, the catheter device comprises a mandrel extending through the snare catheter and comprising a distal end, wherein the mandrel is axially movable relative to the snare catheter. Further in addition, the catheter device may comprise a snare arranged on the distal end of the mandrel for establishing a connection to the implantable medical device, wherein the snare, by moving the mandrel with respect to the snare catheter, is at least partially retractable into the snare catheter. It is the relative movement of the snare's mandrel with respect to the snare catheter that facilitates a cinching behavior that serves to modulate the overall dimensions of the snare. As such, these relative motions can serve to tighten the snare in support of recapture.

The catheter device hence is formed by multiple catheters which are axially movable with respect to one another. A steerable catheter is generally received within an outer catheter, which in one embodiment is non-steerable and is guided on the steerable catheter. The steerable catheter serves for navigating the catheter device's distal end such that is aligned with the implantable medical device. Manipulations of the snare itself (which may or may not be coordinated with relative translational movements of the steerable catheter and/or the snare catheter) serve to establish a connection in between the catheter device and the implantable medical device. Once this connection has been established the catheter device may be used to either reposition or explant the implantable medical device. Within the steerable catheter, a snare catheter is received, which is axially movable with respect to the steerable catheter. The snare catheter serves to guide a mandrel which carries the snare, the snare being functional to establish a physical connection to the implantable medical device.

In one embodiment, a snare is specifically excluded from what is packaged and sold to the end user and the clinician is offered instruction and guidance for characteristics of snare types they themselves can supply, install within the catheter and operate in conjunction with the enveloping catheter to realize the full suite of intended repositioning and/or explantation support for implantable medical devices.

In one embodiment, the catheter device made available to users in sold/distributed formats excludes the co-packaging of an affiliate implantable medical device (e.g., leadless pacemaker)—as such, excluding protection for variants where the catheter device might represent an embodiment nominally intended for implantation procedures and co-distributed with an implantable medical device wherein the catheter device is designed to accommodate in-clinic modifications for use in repositioning or explantation procedures.

The snare catheter may be designed such that it may either surround a snare supplied with the catheter when it is sold/distributed or such that the catheter may be sold/distributed without any snare, and clinicians can subsequently install commercially-available snares with specified characteristics (nominally length, and working-length diameters), to enable the full suite of intended repositioning or explantation functionalities.

By means of the snare a tethered connection with the implantable medical device may be established in that the snare may be placed on a connector of the implantable medical device for engaging with the connector and in this way hooking the implantable medical device to the catheter device. By advancing the snare catheter distally with respect to the steerable catheter the snare may be advanced towards the implantable medical device, wherein the snare catheter provides for a guided and controlled axial movement of the snare. Once the snare is placed on the connector of the implantable medical device, the snare may be retracted into the snare catheter such that the connection with the implantable medical device is tightened and secured so that the implantable medical device is safely connected to the catheter device.

The catheter device may in particular facilitate acute explantation and/or repositioning of a leadless pacemaker.

The catheter device may in particular provide means of navigating to and recapturing a leadless pacemaker that has recently been implanted within a patient's heart and been resident for a short enough duration that the device has not yet been encapsulated by the patient's immune response. Typically, such durations would represent days, weeks, or potentially a handful of months following the initial implantation of the leadless pacemaker.

Furthermore, the catheter device may provide for means of repositioning a leadless pacemaker within the patient's heart after it has been recaptured, if the user wishes to do so.

Specifically, the catheter device may provide for a high usability, reliability, and a means for the user to navigate up to a leadless pacemaker placed in either the apex or septum of the right ventricle, recapture it if it was acutely implanted, and either reposition and release it within a new desired location within the right ventricle, or explant the device and catheter from the patient anatomy.

In one embodiment, the outer catheter comprises a pre-shaped curvature. The outer catheter in particular may be non-steerable such that a steering of the catheter device is (solely) achieved by deflecting the steerable catheter received within the outer catheter. By forming the outer catheter to have a pre-shaped curvature the outer catheter may be easily moved axially along the steerable catheter received within the outer catheter, in particular in situations in which the steerable catheter is articulated over tight angles and geometries.

The pre-shaped curvature in particular may be such that the outer catheter, in a relaxed state with no loading acting on the outer catheter, assumes a predefined curvature, in a defined region or along its entire length, such that the outer catheter for example forms a predefined bend within at least a portion of the outer catheter.

In one embodiment, the catheter device comprises a protective cup for receiving the implantable medical device by retracting the implantable medical device into it, the protective cup being arranged on the outer catheter. Hence, by axially moving the outer catheter with respect to the steerable catheter received within the outer catheter, the protective cup may be moved with respect to the steerable catheter and may in particular be advanced distally with respect to the steerable catheter in order to sheathe the implantable medical device.

Using the protective cup in particular a safe removal of the implantable medical device from e.g. a heart wall may be facilitated by reliably re-sheathing the implant for safe removal from patient anatomy. A safe removal of the implantable medical device from e.g. the heart wall may in particular be achieved by advancing the protective cup once a connection in between the catheter device and the implantable medical device is established using the snare in combination with the snare catheter, and by re-sheathing the implantable medical device using the protective cup in acute explantation situations. For explantation, the implantable medical device, once received within the protective cup, may be dragged out from its implantation site, e.g. the heart, and may be moved down the femoral vein with its fixation mechanism safely received within the protective cup until the implantable medical device is removed from the patient anatomy.

The protective cup may be made of a flexible material, but should be rigid enough to react against the forces of tine retraction without sustaining damage. The protective cup may have an elongated shape and may form an inner lumen for receiving the implantable medical device, such that the implantable medical device including a fixation element such as fixation tines arranged on a distal end of the implantable medical device is received within the protective cup once the outer catheter together with the protective cup is advanced distally to sheathe the implantable medical device, allowing for a safe removal and/or repositioning of the implantable medical device.

In one embodiment, a valve device is arranged on a proximal end of the outer catheter. The valve device may be configured to prevent leakage in between the outer catheter and the steerable catheter at the proximal end of the outer catheter such that the valve device serves to close a lumen in between the outer catheter and the inner, steerable catheter in a fluid-tight manner. In addition, the valve device may serve to provide for a locking in between the outer catheter and the steerable catheter such that, when the valve device is in a locked position, the outer catheter may not be moved with respect to the steerable catheter, but is safely locked in its axial position with respect to the steerable catheter.

The valve device in particular may have the shape of a Tuohy-Borst valve. A Tuohy-Borst valve is designed to prevent a backflow of fluid around an instrument received within an inner lumen of an outer guiding device, in the instant case around the inner, steerable catheter received within the outer catheter.

The valve device in particular may be actuatable by twisting the valve device and in this way may be moved from a locked position to an unlocked position. In the unlocked position the outer catheter may be axially movable with respect to the inner, steerable catheter such that the protective cup arranged on the outer catheter may be distally advanced to sheathe the implantable medical device, or may be proximally moved in order to un-sheathe the implantable medical device.

In one embodiment, the catheter device comprises an alignment component for receiving the implantable medical device and for aligning the implantable medical device with respect to the catheter device when the implantable medical device is connected to the catheter device.

The alignment component for example may have the shape of a cup or cone, which may be designed to receive the implantable medical device at medical device's proximal end. The alignment component in particular serves to align the implantable medical device with respect to the catheter device such that, once the connection in between the implantable medical device and the catheter device is established, the implantable medical device is securely held on the catheter device in a defined, aligned position.

The alignment component may, in one embodiment, be placed on a distal end of the steerable catheter. In this case, the alignment component may be brought into operative connection with the implantable medical device by establishing the connection using the snare and by moving the snare catheter with respect to the steerable catheter in a proximal direction until the implantable medical device at its proximal end engages with the alignment component.

In another embodiment the alignment component may be placed on a distal end of the snare catheter. In this case the operative connection in between the implantable medical device and the catheter device is established by placing the snare around the connector of the implantable medical device and by retracting the snare into the snare catheter, wherein by retracting the snare into the snare catheter both the connection in between the implantable medical device and the catheter device is tightened and the implantable medical device, with its proximal end, is moved into operative connection with the alignment component arranged on the distal end of the snare catheter.

In one embodiment, the snare is formed by a wire made of a radiopaque material. Generally, when advancing the catheter device towards an implantable medical device which shall be repositioned or explanted, the snare is to be advanced towards a connector of the implantable medical device and is to be placed on the connector such that a connection in between the implantable medical device and the catheter device may be established. Herein, as the repositioning or explantation shall take place in an implanted state of the medical device, the navigation of the catheter device, in particular the snare of the catheter device, shall take place under assistance using medical imaging, in particular based on X-ray imaging, making it necessary that the snare is visible in the medical imaging. For this, the snare is formed from a radiopaque material such that the snare may be navigated in order to place the snare on the connector of the implantable medical device.

The snare may for example be made from a nitinol-core wire, for example with a gold wire woven or wrapped around it.

In one embodiment, the snare forms a single loop which can be placed on the connector of the implantable medical device. The loop may for example have a diameter in between 15 mm to 40 mm, for example between 25 mm to 30 mm. The loop may be retracted into the snare catheter such that in this way, once the loop is placed on the connector of the implantable medical device, the connection in between the implantable medical device and the catheter device may be tightened and secured.

In one embodiment, the loop is offset at an angle from the mandrel on which the snare is arranged. The loop may for example extend along a plane. Herein, the plane is arranged at an oblique angle with respect to the mandrel, such that the loop is connected to the mandrel in a way that the loop obliquely extends from the mandrel. This makes it possible to easily capture the connector of the implantable medical device in that the loop may be placed on the connector by axially approaching the snare catheter towards the implantable medical device, hence allowing for an improved control and capturing operation.

In one embodiment, the snare comprises, in particular at a distal location with respect to the mandrel, a bight for establishing the connection to the implantable medical device. The bight may have a generally triangular shape and may be formed by the wire forming the loop of the snare. The bight in particular may be shaped such that the connector may be received within the bight in order to provide for a reliable and secure connection in between the catheter device and the implantable medical device and to allow for an easy capturing with a reduced risk of again losing the connector of the implantable medical device.

In one embodiment, the catheter device comprises a handle piece for controlling the catheter device. The handle piece may be placed at a proximal end of the catheter device such that the handle piece, during use of the catheter device, remains outside of the patient.

By actuating the handle piece the catheter device may in particular be controlled for navigating towards the implantable medical device and for capturing the medical device.

In one embodiment, the handle piece comprises a control device for controlling a deflection of the steerable catheter, such that by means of the handle piece the steerable catheter may be deflected for navigating the catheter device towards an implantable medical device. The control device may in particular have the shape of a wheel which may be turned in order to cause a deflection at the steerable catheter.

The steerable catheter, in one embodiment, is fixedly connected to the handle piece in a way that the axial position of the steerable catheter with respect to the handle piece is fixed.

In one embodiment, the handle piece comprises a lock mechanism for axially locking the snare catheter with respect to the steerable catheter. In a locked position of the lock mechanism, the snare catheter is arrested with respect to the handle piece such that the axial position of the snare catheter is fixed relative to the steerable catheter. In an unlocked position of the lock mechanism, in turn, the snare catheter is axially movable with respect to the steerable catheter such that the snare catheter may be distally advanced towards an implantable medical device, or may be proximally moved within the steerable catheter in order to establish the connection of the implantable medical device to the catheter device.

An object of this filing is also achieved by means of a method for operating a catheter device for repositioning or explanting an implantable medical device, comprising: providing a catheter device comprising an outer catheter and a steerable catheter extending through the outer catheter, wherein the outer catheter is axially movable with respect to the steerable catheter; and establishing a connection to the implantable medical device using a snare catheter extending through the steerable catheter, a mandrel extending through the snare catheter and comprising a distal end, and a snare arranged on the distal end of the mandrel; wherein said establishing the connection includes axially moving the snare catheter relative to the steerable catheter, axially moving the mandrel relative to the snare catheter, and retracting the snare, by moving the mandrel with respect to the snare catheter, at least partially into the snare catheter.

The advantages and advantageous embodiments described above for the catheter device equally apply also to the method, such that it shall be referred to the above in this respect.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

The idea underlying the present invention shall subsequently be described in more detail with reference to the embodiments shown in the drawings. Herein:

FIG. 7A-G show steps of navigating a catheter device to an implantation site of an implantable medical device for establishing a connection in between the implantable medical device and the catheter device.

DETAILED DESCRIPTION

Figure 1:
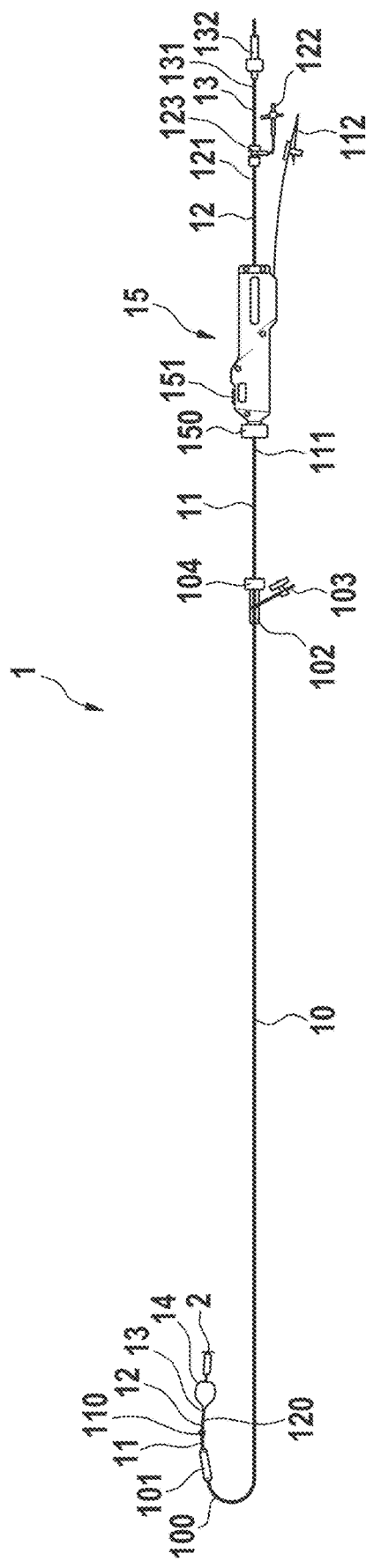
FIG. 1 shows a schematic representation of an embodiment of a catheter device for repositioning or explanting an implantable medical device.

In an embodiment shown in FIG. 1, a catheter device 1 comprises an outer catheter 10, an inner, steerable catheter 11, a snare catheter 12, a mandrel 13 guided within the snare catheter 12, and a snare 14 formed on the mandrel 13. The catheter device 1, as shown in FIG. 1, may be used to capture an implantable medical device 2 in an acutely implanted state at an implantation site, for example within a patient's heart, for example within the right ventricle of the patient's heart, in order to reposition or explant the implantable medical device 1.

In the embodiment of FIG. 1, the steerable catheter 11 is received in and extends through an inner lumen of the outer catheter 10. The outer catheter 10 herein is axially movable with respect to the steerable catheter 11.

The snare catheter 12 extends through an inner lumen of the steerable catheter 11 such that the snare catheter 12 is axially movable with respect to the steerable catheter 11.

The mandrel 13 extends through an inner lumen of the snare catheter 12 such that the mandrel 13 is axially movable with respect to the snare catheter 12.

Figure 2:
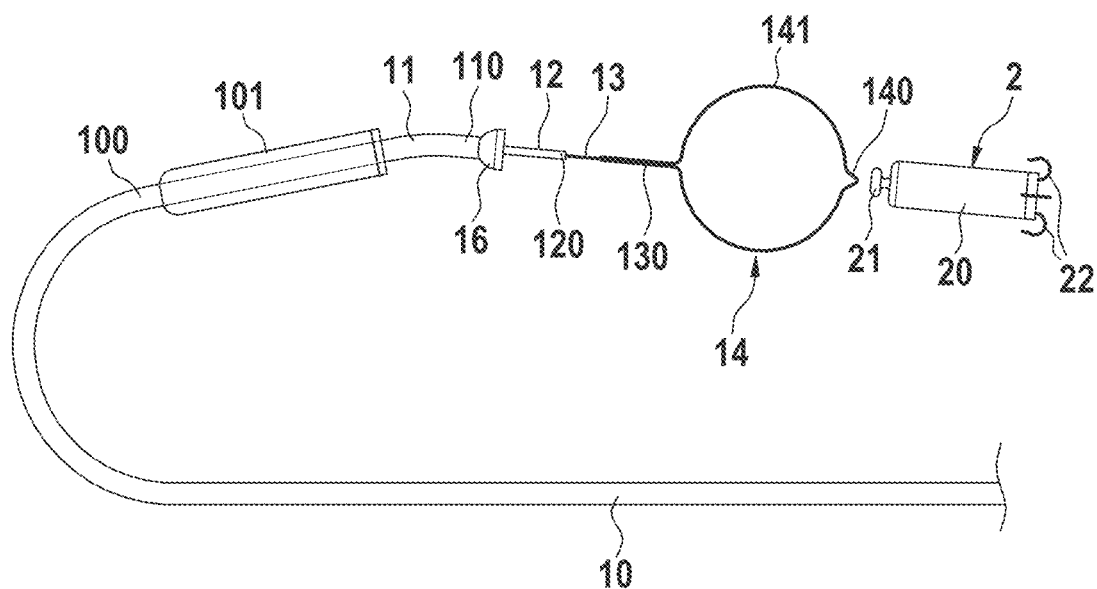
FIG. 2 shows an enlarged view of a distal portion of the catheter device.

Referring now to FIG. 2, the outer catheter 10, at its distal end 100, carries a protective cup 101 having a hollow, elongated shape operative to receive the implantable medical device 2 within. By moving the outer catheter 10 with respect to the steerable catheter 11 the protective cup 101 may be advanced over the steerable catheter 11 in order to sheathe the implantable medical device 2 for the purpose of repositioning or explanting the implantable medical device 2.

In the embodiment of FIG. 2, the steerable catheter 11 at its distal end 110 carries an alignment component 16 in the shape of a cup or cone which is configured to receive a distal end of a body 20 of the implantable medical device 2 (i.e., connector 21). The alignment component 16 in particular is configured to fix the position of the implantable medical device 2 with respect to the catheter device 1 once the implantable medical device 2 is connected to the catheter device 1, such that, in a connected state, the implantable medical device 2 is held in an aligned fashion on the distal end of the catheter device 1.

The snare catheter 12, which is axially movable within the steerable catheter 11, guides the mandrel 13 within. The mandrel 13 extends through the snare catheter 12 and beyond a distal end 120 of the snare catheter 12, but may be proximally retracted into the snare catheter 12.

On a distal end 130 of the mandrel 13 a snare 14 in the shape of, in one embodiment, a single loop 141 is arranged, the snare 14 in particular being made of a radiopaque wire such that the snare 14 is visible and trackable using medical imaging based on X-rays. For example, the loop 141 may be made of a nitinol core around which a gold wire is woven or wrapped, providing for a sufficient elasticity and durability as well as for a radiopaque visibility.

The loop 141 of the snare 14 is operative to be placed on a T-shaped connector 21 formed on the body 20 of the implantable medical device 2. The snare 14 herein may be retracted into the snare catheter 12 by moving the mandrel 13 proximally with respect to the snare catheter 12, hence tightening the loop 141 and fixing the implantable medical device 2 to the catheter device 1.

A bight (or bights) 140 is formed on the loop 141 of the snare 14, the bight 140 having a generally more pointed shape, such as a generally triangular shape and being formed such that the connector 21 may be received within the bight 140 in order to provide for a secure connection in between the snare 14 and the implantable medical device 2.

Figure 3:
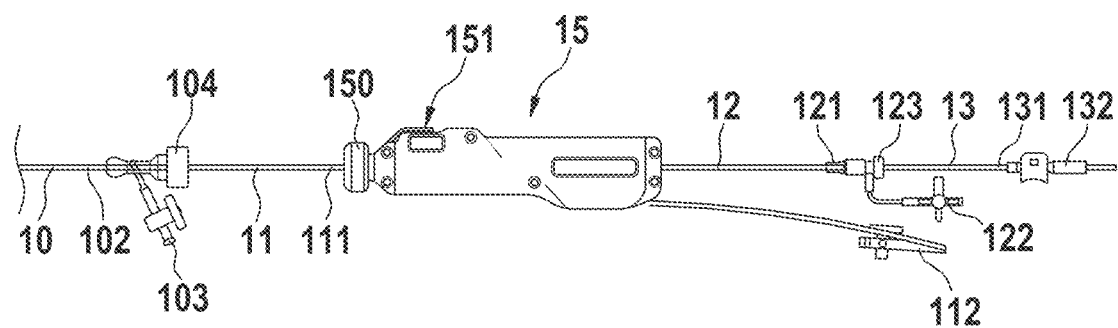
FIG. 3 shows an enlarged view of a proximal portion of the catheter device.

Referring now to FIG. 3, the catheter device 1 at its proximal end comprises a handle piece 15 which is connected to the steerable catheter 11 such that the steerable catheter 11 is axially fixed at a proximal end 111 with respect to the handle piece 15.

Herein, a control device 150 is placed on the handle piece 15 which allows to control the steerable catheter 11 in that by means of the control device 150 a deflection in a distal region of the steerable catheter 11 may be controlled in order to navigate the catheter device 1 through vessels towards an implantation site.

The control device 150 may have the shape of a rotatable wheel providing for a steering mechanism allowing for controlling a deflection of the steerable catheter 11.

The handle piece 15 further comprises a lock mechanism 151 which may be actuated in order to lock or unlock the snare catheter 12 with respect to the handle piece 15 and hence with respect to the steerable catheter 11. In particular, in a locked position of the lock mechanism 151 the snare catheter 12 is axially fixed with respect to the handle piece 15 and hence with respect to the steerable catheter 11. In an unlocked position, in turn, the snare catheter 12 may be axially moved with respect to the handle piece 15 and hence with respect to the steerable catheter 11, in particular to approach the implantable medical device 2 by moving the snare catheter 12 distally, or by bringing the implantable medical device 2 into abutment with the alignment component 16 arranged on the distal end 110 of the steerable catheter 11 after capturing the implantable medical device 2.

The snare catheter 12 extends through the handle piece 15. At a proximal end 121 of the snare catheter 12 herein a flush port 122 for providing for a flushing of the snare catheter 12 is arranged.

In addition, a locking device 123 arranged at the proximal end 121 of the snare catheter 12 provides for a locking in between the snare catheter 12 and the mandrel 13. In a locked position of the locking device 123 the mandrel 13 is axially fixed with respect to the snare catheter 12. By unlocking the locking device 123 the mandrel 13 may be axially moved with respect to the snare catheter 12 in that a user may grab a grip device 132 arranged at a proximal end 131 of the mandrel 13 in order to advance the mandrel 13 distally or proximally with respect to the snare catheter 12.

A flush port 112 is arranged on the handle device 15 allowing for a flushing of the steerable catheter 11.

The outer catheter 10 is placed on the steerable catheter 11 such that it axially is movable along the steerable catheter 11. Herein, at a proximal end 102 of the outer catheter 10 a valve device 104 in the shape of a Tuohy-Borst valve is arranged, the valve device 104 providing for a leakage prevention at the proximal end 102 of the outer catheter 10 and for an axial locking of the outer catheter 10 with respect to the steerable catheter 11. The valve device 104 may be unlocked in order to allow for an axial movement of the outer catheter 10 with respect to the steerable catheter 11, for example by twisting the valve device 104.

The valve device 104, in one embodiment, may also be functional to allow for an axial movement of the outer catheter 10 with respect to the steerable catheter 11 without having to specifically unlock the valve device 104.

In addition, a flush port 103 is arranged at the proximal end 102 of the outer catheter 10, allowing for a flushing of the outer catheter 10.

The protective cup 101 arranged at the distal end 100 of the outer catheter 10 serves to allow for receiving the implantable medical device 2 for the purpose of repositioning or explanting the implantable medical device 2.

Figure 4:
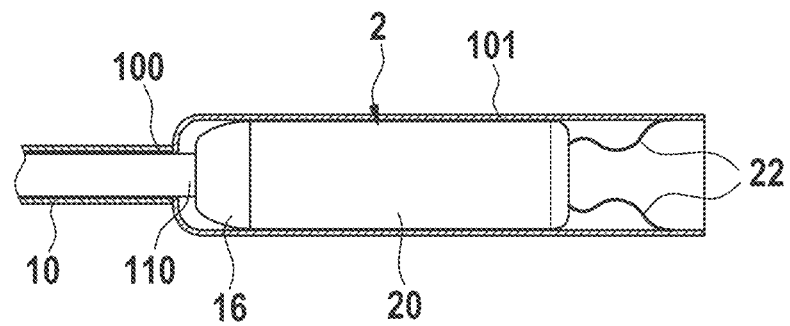
FIG. 4 shows a schematic view of an implantable medical device received in a protective cup arranged on an outer catheter of the catheter device

Referring now to FIG. 4, after capturing the connector 21 of the implantable medical device 2 by means of the snare 14 and after retracting the snare 14 into the snare catheter 12 by moving the mandrel 13 proximally, and in addition after operatively connecting the implantable medical device 2 to the alignment component 16 by moving the snare catheter 12 proximally within the steerable catheter 11, the outer catheter 10 may be advanced distally in order to retract the implantable medical device 2 into the protective cup 101, as this is shown in FIG. 4.

In a sheathed state the implantable medical device 2 is received within an inner lumen of the hollow protective cup 101, such that fixation elements 22 in the shape for example of fixation tines protruding from a distal end of the implantable medical device 2 are received within the protective cup 101 as shown in FIG. 4. Hence, a safe removal or repositioning of the implantable medical device 2 is possible, without a risk that the fixation elements 22 may unintentionally engage with tissue.

In the embodiment of FIG. 2, the alignment component 16 is arranged on the distal end 110 of the steerable catheter 11. In another embodiment, shown in FIG. 5, the alignment component 16 is arranged on the distal end 120 of the snare catheter 12, such that when retracting the mandrel 13 with the snare 14 arranged thereon proximally into the snare catheter 12 the connection in between the implantable medical device 2 and the catheter device 1 is tightened and, in addition, the implantable medical device 2 is brought into operative connection with the alignment component 16 and hence is aligned with respect to the catheter device 1.

Figure 6A:
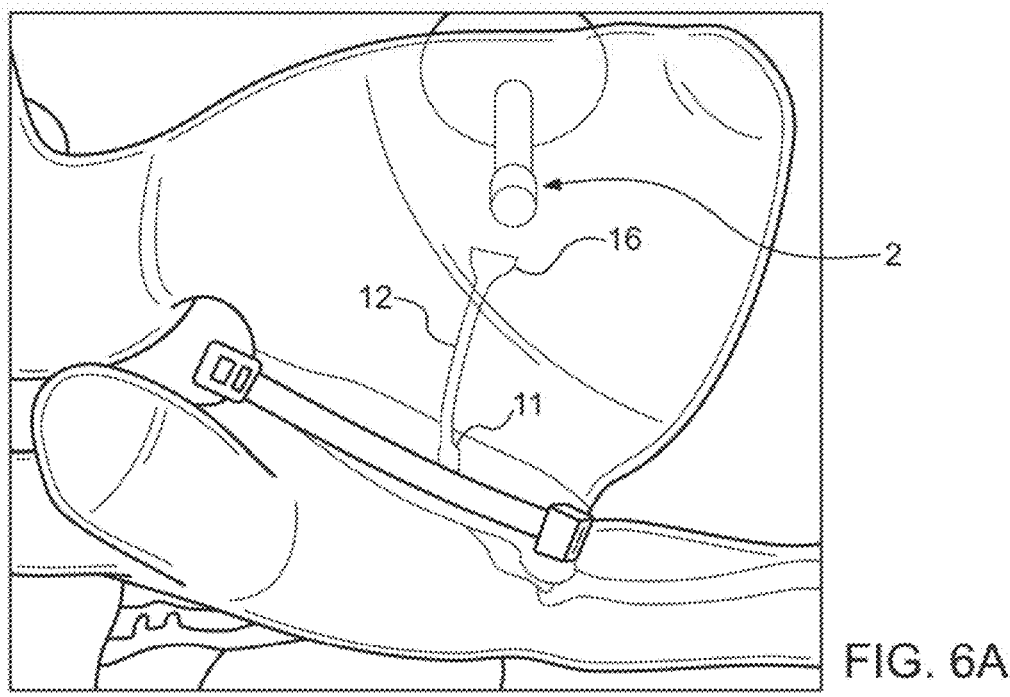
FIG. 6A-B show an implantable medical device at different implantation sites.
Figure 6B:
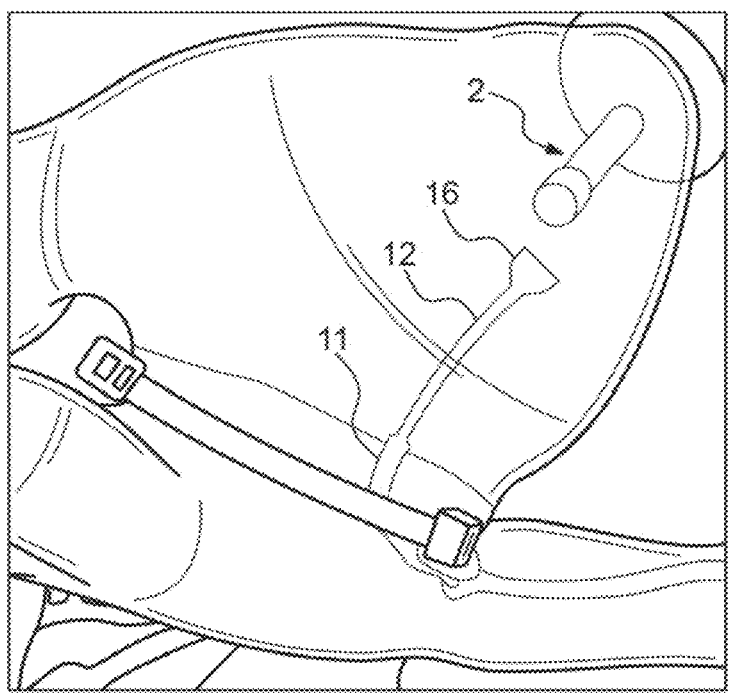

The catheter device 1, as visible from FIG. 6A and FIG. 6B, may be used to reposition or explant an implantable medical device 2 arranged at different implantation sites within a patient, for example within the septum of the right ventricle (FIG. 6A) or within the apex of the right ventricle (FIG. 6B), wherein the same catheter device 1 may be used independent of where the implantable medical device 2 is specifically implanted.

Figure 7E:
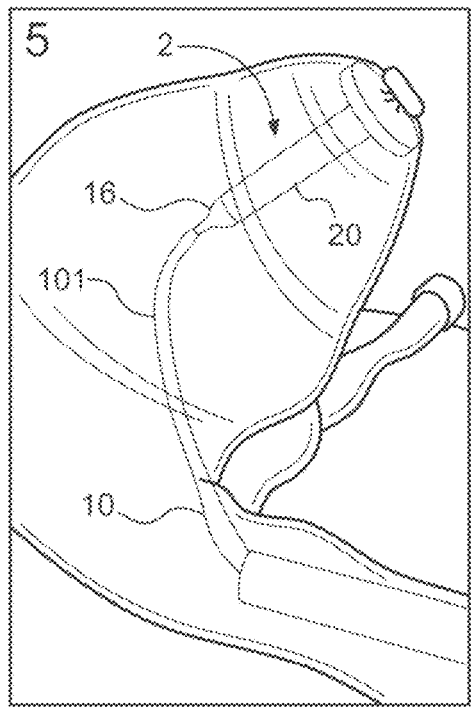

Referring now to FIGS. 7A to 7G, when an implantable medical device 2 implanted for example in a patient's heart, for example at the apex of the right ventricle of the patient's heart, shall be repositioned or explanted, the catheter device 1 is advanced towards the implantation site by suitably steering the catheter device 1 using the steerable catheter 11 (FIG. 7A).

Figure 5:
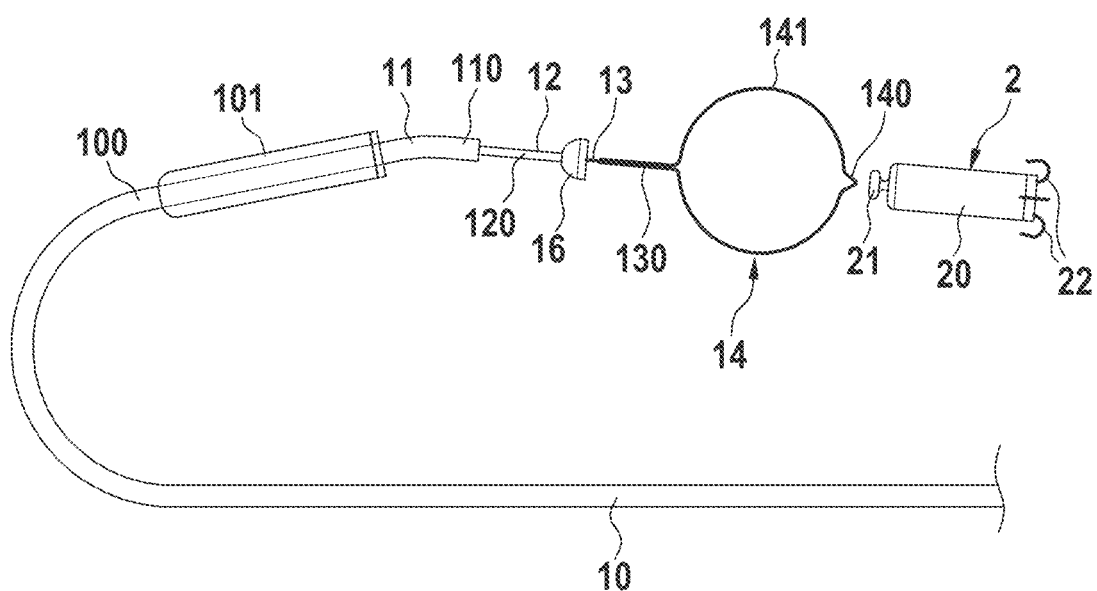
FIG. 5 shows a schematic representation of another embodiment of a catheter device for repositioning or explanting an implantable medical device.

Once a distal end of the catheter device 1 is brought into the vicinity of the implantable medical device 2 (FIG. 7B), the snare catheter 12 is advanced distally, which in the embodiment of FIGS. 7A to 7G carries the alignment component 16 similar to the embodiment of FIG. 5. Hence, the snare 14 extending from the distal end 120 of the snare catheter 12 is advanced towards the connector 21 formed on the body 20 of the implantable medical device 2 and is placed on the connector 21 (FIG. 7C) in order to then retract the snare 14 into the snare catheter 12 in order to bring the implantable medical device 2 into operative connection with the alignment component 16 (FIGS. 7D and 7E).

Figure 7F:
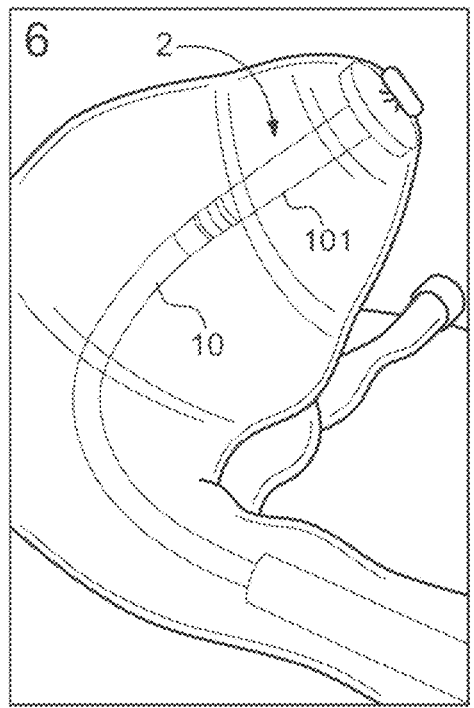
Figure 7G:
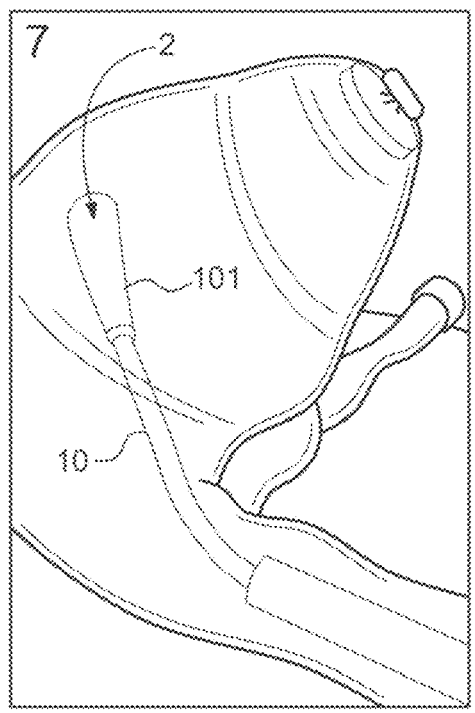

Once the operative connection in between the alignment component 16 and the implantable medical device 2 is achieved, the outer catheter 10 is advanced distally in order to move the protective cup 101 over the alignment component 16 and hence over the implantable medical device 2 (FIG. 7F). The implantable medical device 2 is hence re-sheathed, and the fixation elements 22 are removed from tissue on which the implantable medical device 2 has been placed.

By then moving the catheter device 1 (FIG. 7G), the implantable medical device 2 may be repositioned or explanted.

Figure 8A:
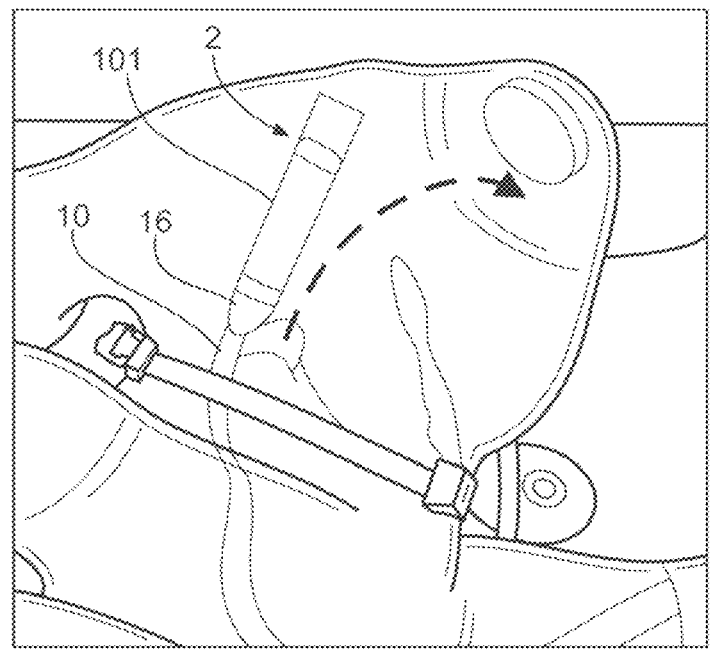
FIG. 8A-B shows steps of repositioning an implantable medical device using a catheter device.
Figure 8B:
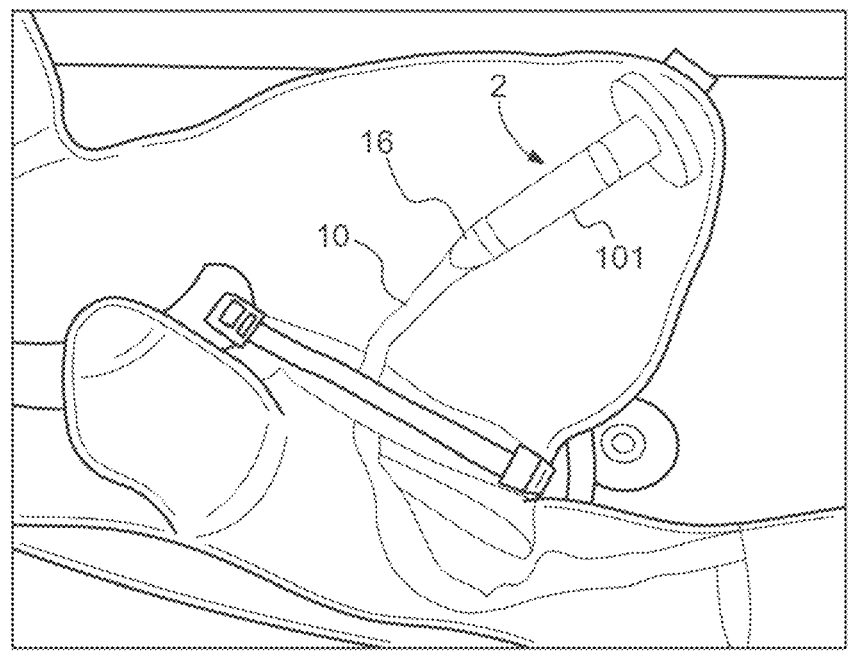

Referring now to FIGS. 8A and 8B, a repositioning of the implantable medical device 2 may be controlled using the steerable catheter 11. In particular, after the connection to the implantable medical device 2 is established, the steerable catheter 11 may be controlled in order to deflect the steerable catheter 11 for moving the implantable medical device 2 from a prior implantation site, for example on a septum of the right ventricle (FIG. 8A), to a new implantation site, for example at the apex of the right ventricle (FIG. 8B).

In one embodiment, the catheter device comprises an outer non-steerable and shape set outer catheter that is connected to the cup that is used to sheathe and unsheathe the implant and its fixation mechanism. It also comprises an inner steerable catheter that is used for aligning the catheter device's distal end with an implantable medical device located within a patient's heart. There may also be a non-steerable catheter that is placed within the ID of the steerable catheter that serves to modulate the open and closed conditions of a radiopaque, shape-set implant recapture snare by means of relative translational movements between said catheter and a snare-connected mandrel that passes within. It is through such modulation of the snare's open and closed conditions that the design solution provides a means for establishing/regaining a connection to a non-encapsulated, but implanted leadless pacemaker through targeted mechanical engagements with implant's proximally-stationed connector i.e. in form of a hitch.

In one embodiment, the snare can be advanced distally and proximally by pushing or pulling the mandrel that is connected to it at the proximal end of the handle. A wire clamp or torque mechanism is utilized to grab the mandrel so that the user may easily push and pull the mandrel/snare. The handle has a lock/unlock actuator that supports holding the snare in a closed state once recapture has occurred. This locking fixes the relative positions of the snaring catheter with the snare's mandrel in cases where the snaring catheter is present or it fixes the relative positions of the inner steerable catheter with the snare's mandrel in cases where the snaring catheter is not present. This capability in turn serves to supports resheathing of the implant. The handle also has a steering control that steers the inner steerable catheter. The handle is mechanically designed so that when the user removes their hand from the handle or handle steering actuator, the steering position remains fixed and does not relax or return to its nominal/starting position. The outer non-steerable/shape set catheter utilizes a Tuohy-Borst valve connected to its proximal end to prevent leaks and to act as a locking mechanism for stabilizing the position of the outer catheter relative to the position of the inner steerable catheter. The Tuohy-Borst valve either via a twisting actuation from the user (or a pushing actuation that overcomes frictional locking inherent to the valve's seal) allows the valve to be clamped into a fixed position over the inner steerable catheter. A reverse twist of the valve (if necessitated by the embodiment) or a pulling force sufficient enough to overcome the built-in valve frictional locking behavior subsequently unlocks the outer catheter from a fixed position so that the user can advance it either proximally or distally. The user would need to advance the outer catheter distally over the inner steerable catheter to re-sheathe an implant and a user would need to retract the outer steerable catheter proximally in order to deploy the implant in cases of device repositioning.

The inner steerable catheter may be designed to be able to easily and reliably navigate up to the implantation site. The snare may then be utilized to grab onto the implant from various different orientations. Once a connection between the catheter and implant is established, the outer catheter is advanced over the steerable catheter. The outer catheter does not have steering incorporated into it, but does have a shape set curve. The shape set curve, coupled with the flexibility of the outer catheter materials allows the outer catheter to track over the steerable catheter to reach the implant.

In cases where the user desires to redeploy the leadless pacemaker after it has been explanted, the user can use the steering functionality of the inner steerable catheter to reposition the implant to a new location within the right ventricle and redeploy it.

The catheter device may comprise one or more (or all) of the following features:

- An inner steerable catheter that has a high degree of control and maneuverability that is able to easily access implantation sites within the heart and, in cases where the device does not incorporate a snare catheter, may additionally serve to modulate the open or closed conditions of the snare housed within.
- An outer non-steerable catheter (with a shape set curve and protector cup stationed at its distal end) that is able to be advanced distally and proximally over the inner steerable catheter, even when the inner steerable catheter has been articulated over tight angles and geometries to re-sheathe implants in ways that minimize anatomical stresses within the heart and protect patient anatomy from exposure to device fixation features.
- An optional inner non-steerable snare catheter that if present is able to facilitate modulating the open or closed conditions of a snare housed within through relative translational motions of the snare catheter with respect to the snare's supporting mandrel.
- An optional single- or multi-loop snare (or the accommodation for physicians to install commercial snares with prescribed characteristics) supporting the establishment of tethered connections with the implant's connector (i.e. in form of a hitch) in service of recapturing and repositioning needs.
- The ability to lock the outer steerable catheter to a fixed position over the inner steerable catheter whether by means of an explicit locking feature or by means of carefully managed frictional engagements within sealing mechanism between the inner and outer catheters.
- A steering mechanism or actuator that allows the user a high degree of steering control over the inner steerable catheter. The steering mechanism or actuator maintains the fixed steering position of the catheter whenever the user removes his or her hands from the mechanism or actuator.
- The ability for the user to re-sheathe the implant into the outer catheter's implant protective cup safely and reliably.
- The ability for the user to use the inner steerable catheter's steering mechanism or actuator to reposition the implant after it has been re-sheathed, and redeploy the implant within newly chosen implantation site.
- The ability for the user to perform a mechanical tug test of the implant to assess tine fixation within the new implantation site prior to release of the implant and disengagement of the tether between the snare and the implant's connector (i.e. in form of a hitch).
- The ability to remove the implant and catheter tooling safely from the anatomy if the user does not wish to reposition the implant to a new location within the patient's heart.

The concept associated with the present disclosure may allow for the realization of a dedicated tool specifically designed to safely and reliably navigate up to a leadless pacemaker placed within a patient's heart, explant the leadless pacemaker after establishing a tethered connection to it via a snare, and either reposition it to a new location with the heart, or remove the implant and catheter safely from the patient's anatomy.

One advantage of the proposed catheter device may be that an inner steerable catheter is utilized as the means to navigate safely, reliably, and easily up to the implantation location. This is accomplished because the inner steerable catheter does not have an implant protective cup attached to it. The implant protective cup acts as a long linear and non-articulable component that can prohibit movement through tight geometries and radii.

When a leadless pacemaker has been acutely implanted, it is important to allow the user as much control as possible to navigate the catheter up to the implant. Once a tethered connection is able to be established via the inner steerable catheter, snare, and implant, the outer shape set (non-steerable) catheter is just advanced over OD of the inner steerable catheter and up to the implant. Since a connection to the implant has already been established, the long linear length of the implant protective cup is just easily tracked over the inner steerable catheter's OD and it does not require any steering to perform this action. Once the implant protective cup arrives at the implant, the implant is then easily retracted and re-sheathed into the cup.

It is at this point that the user can either choose to reposition the implant to a new deployment location, or remove the implant and tooling from the patient anatomy. A tool hence is provided that allows a user to be able to perform this procedure, to explant and or reposition and redeploy an acutely implanted leadless pacemaker, especially in such a safe and reliable manner.

The features disclosed in regard with the system (explanation/repositioning catheter) may also apply to a method (e.g. for explanting and/or repositioning a leadless pacemaker) and vice versa.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

LIST OF REFERENCE NUMERALS

1 Catheter device
10 Outer catheter
100 Distal end
101 Protective cup
102 Proximal end
103 Flush port
104 Valve device (Tuohy-Borst valve)
11 Steerable catheter
110 Distal end
111 Proximal end
112 Flush port
12 Snare catheter
120 Distal end
121 Proximal end
122 Flush port
123 Locking device
13 Mandrel
130 Distal end
131 Proximal end
132 Grip device
14 Snare
140 Bight
141 Loop
15 Handle piece
150 Control device
151 Control device
16 Alignment component (cup)
2 Implantable medical device (leadless pacemaker)
20 Body
21 Connector
22 Fixation element

The invention claimed is:

1. A catheter device for repositioning or explanting an implantable medical device, comprising:
a non-steerable outer catheter,
a steerable catheter extending through the non-steerable outer catheter, wherein the non-steerable outer catheter is axially movable with respect to the steerable catheter,
a handle piece comprising a control device having a steering mechanism comprising a rotatable wheel for directly controlling a deflection of the steerable catheter, and
a snare catheter extending through the steerable catheter, wherein the snare catheter is axially movable relative to the steerable catheter, the snare catheter being configured to receive a mandrel carrying a snare such that the mandrel is axially movable relative to the snare catheter, and
wherein the handle piece further comprises a lock mechanism for axially locking the snare catheter with respect to the steerable catheter.

2. The catheter device of claim 1, wherein the outer catheter comprises a pre-shaped curvature.

3. The catheter device of claim 1, wherein a protective cup for sheathing the implantable medical device, wherein the protective cup is arranged on the outer catheter.

4. The catheter device of claim 3, wherein the implantable medical device is sheathable using the protective cup by moving the outer catheter with respect to the steerable catheter.

5. The catheter device of claim 1, wherein a valve device arranged on a proximal end of the outer catheter, wherein the valve device is configured to prevent leakage in between the outer catheter and the steerable catheter at the proximal end of the outer catheter and to axially lock the outer catheter with respect to the steerable catheter in a locked position of the valve device.

6. The catheter device of claim 1, wherein an alignment component for receiving the implantable medical device and for aligning the implantable medical device with respect to the catheter device when the implantable medical device is connected to the catheter device.

7. The catheter device of claim 6, wherein the steerable catheter comprises a distal end, wherein the alignment component is arranged on the distal end of the steerable catheter.

8. The catheter device of claim 6, wherein the snare catheter comprises a distal end, wherein the alignment component is arranged on the distal end of the snare catheter.

9. The catheter device of claim 1, wherein the mandrel extends through the snare catheter and comprises a distal end, wherein the mandrel is axially movable relative to the snare catheter, and the snare is arranged on the distal end of the mandrel for establishing a connection to the implantable medical device, wherein the snare, by moving the mandrel with respect to the snare catheter, is at least partially retractable into the snare catheter.

10. The catheter device of claim 9, wherein the snare is formed by a wire made of a radiopaque material.

11. The catheter device of claim 9, wherein the snare forms one or multiple loops for reaching around a connector of the implantable medical device.

12. The catheter device of claim 9, wherein the snare comprises a bight for establishing said connection to the implantable medical device.

13. A method for operating a catheter device for repositioning or explanting an implantable medical device, comprising:
providing a catheter device comprising: a non-steerable outer catheter and a steerable catheter extending through the non-steerable outer catheter, wherein the non-steerable outer catheter is axially movable with respect to the steerable catheter; a handle piece comprising a control device having a steering mechanism comprising a rotatable wheel for directly controlling a deflection of the steerable catheter, the handle piece further comprising a lock mechanism for axially locking the snare catheter with respect to the steerable catheter, establishing a connection to the implantable medical device using a snare catheter extending through the steerable catheter, a mandrel extending through the snare catheter and comprising a distal end, and a snare arranged on the distal end of the mandrel, wherein said establishing the connection includes axially moving the snare catheter relative to the steerable catheter, axially moving the mandrel relative to the snare catheter, and retracting the snare, by moving the mandrel with respect to the snare catheter, at least partially into the snare catheter.

14. A catheter device for repositioning or explanting an implantable medical device, comprising:

a non-steerable outer catheter, a steerable catheter extending through the non-steerable outer catheter, wherein the non-steerable outer catheter is axially movable with respect to the steerable catheter, a handle piece comprising a control device having a steering mechanism comprising a rotatable wheel for directly controlling a deflection of the steerable catheter, and a mandrel carrying a snare such that the mandrel is axially movable relative to the steerable catheter.

\* \* \* \* \*